(12) United States Patent
Mizuno et al.

(10) Patent No.: US 7,537,705 B2
(45) Date of Patent: May 26, 2009

(54) METHOD FOR TREATING FEEDWATER

(75) Inventors: William G. Mizuno, Golden Valley, MN (US); Ellen Voeller, legal representative, Golden Valley, MN (US); Michael E. Besse, Golden Valley, MN (US); Brenda L. Tjelta, St. Paul, MN (US)

(73) Assignee: Ecolab Inc., St. Paul, MN (US)

( * ) Notice: Subject to any disclaimer, the term of this patent is extended or adjusted under 35 U.S.C. 154(b) by 0 days.

(21) Appl. No.: 12/052,880

(22) Filed: Mar. 21, 2008
(Under 37 CFR 1.47)

(65) Prior Publication Data
US 2008/0223791 A1 Sep. 18, 2008

Related U.S. Application Data

(63) Continuation of application No. 11/067,301, filed on Feb. 25, 2005, now abandoned.

(51) Int. Cl.
*C02F 5/10* (2006.01)
*C02F 5/14* (2006.01)

(52) U.S. Cl. .................... 210/699; 134/25.1; 134/25.2; 134/25.4; 134/29; 210/698; 210/700; 210/701

(58) Field of Classification Search .................. 210/701
See application file for complete search history.

(56) References Cited

U.S. PATENT DOCUMENTS

| | | | |
|---|---|---|---|
| 2,358,222 A | 9/1944 | Fink et al. | |
| 2,539,305 A | 1/1951 | Hatch | |
| 3,234,124 A | 2/1966 | Irani | |
| 3,285,886 A | 11/1966 | Gunderson et al. | |
| 3,298,956 A | 1/1967 | Irani et al. | |
| 3,347,797 A | 10/1967 | Kuegemann et al. | |
| 3,356,526 A | 12/1967 | Waldman et al. | |
| 3,389,059 A | 6/1968 | Goeldner | |

(Continued)

FOREIGN PATENT DOCUMENTS

BE 773442 1/1972

(Continued)

OTHER PUBLICATIONS

Acumer® Optidose Water Treatment Polymers, © Rohm and Haas Company, 1995, pp. 1-2, http://optidose.com/WaterPoly.html (Aug. 18, 2003).

(Continued)

*Primary Examiner*—Peter A Hruskoci
(74) *Attorney, Agent, or Firm*—Andrew D. Sorensen; Anneliese S. Mayer; Amy J. Hoffman (57) ABSTRACT

A method for treating feedwater is provided. The method includes steps of introducing a treatment composition into a feedwater stream to provide a treated feedwater stream containing scale inhibitor at a concentration of at least about 0.1 ppm, and combining the treated feedwater stream with a detersive composition. The scale inhibitor can include a phosphate scale inhibitor, a carbonate scale inhibitor, or a combination of a phosphate scale inhibitor and a carbonate scale inhibitor. The detersive composition can be provided as a cleaning composition, a rinse agent composition, or a drying agent composition. A treatment composition and an apparatus for treating feedwater are provided.

14 Claims, 1 Drawing Sheet

U.S. PATENT DOCUMENTS

| | | | |
|---|---|---|---|
| 3,394,083 | A | 7/1968 | Shen |
| 3,451,939 | A | 6/1969 | Ralston |
| 3,518,200 | A | 6/1970 | Fitch et al. |
| 3,574,523 | A | 4/1971 | Hudson, Jr. et al. |
| 3,586,633 | A | 6/1971 | Schlussler |
| 3,774,625 | A | 11/1973 | Wiltrout |
| 3,919,297 | A | 11/1975 | Kruegger et al. |
| 3,957,695 | A | 5/1976 | Davies et al. |
| 4,000,091 | A | 12/1976 | Wentler |
| 4,265,776 | A | 5/1981 | Gohla et al. |
| 4,277,359 | A | 7/1981 | Lipinski |
| 4,579,676 | A | 4/1986 | Bull |
| 4,797,223 | A | 1/1989 | Amick et al. |
| 5,413,128 | A | 5/1995 | Butts |
| 6,177,392 | B1 | 1/2001 | Lentsch et al. |
| 6,194,371 | B1 | 2/2001 | Donovan et al. |
| 6,210,600 | B1 | 4/2001 | Zhou et al. |
| 6,258,765 | B1 | 7/2001 | Wei et al. |
| 6,293,290 | B1 | 9/2001 | Bruce |
| 6,395,185 | B1 | 5/2002 | Gauthier et al. |
| 6,656,353 | B2 | 12/2003 | Kilawee et al. |
| 6,726,779 | B2 | 4/2004 | Klos et al. |
| 6,998,375 | B2 | 2/2006 | Kapur et al. |
| 7,087,189 | B2 | 8/2006 | Austin et al. |
| 2002/0137649 | A1 | 9/2002 | Carnali |
| 2004/0033919 | A1 | 2/2004 | Ruhr |
| 2006/0191851 | A1 | 8/2006 | Mizuno et al. |

FOREIGN PATENT DOCUMENTS

| | | |
|---|---|---|
| DE | 10100163 | 7/2002 |
| EP | 0163494 | 12/1985 |
| EP | 0430574 | 6/1991 |
| EP | 0551670 | 7/1993 |
| EP | 1346957 | 9/2003 |
| WO | WO01/96514 | 12/2001 |
| WO | WO02/48049 | 6/2002 |
| WO | WO03/099983 | 4/2003 |
| WO | WO2004/061068 | 7/2004 |
| WO | WO2004/061069 | 7/2004 |
| WO | WO2005/005329 | 1/2005 |

OTHER PUBLICATIONS

Acumer® Water Treatment Polymers, Rohm and Haas Company, pp. 1-5, http://optidose.com/WaterBenefits.html (Aug. 18, 2003).

Acusol® 586 Detergent Polymers, © Rohm and Haas Company 2001, 1 page.

Acusol® 587 Detergent Polymers, © Rohm and Haas Company 2001, 1 page.

Alcoguard® 4000 Technical Information, Alco Chemical™, Technical Bulletin 16009, Oct. 30, 2002, 1 Page.

Alcoguard® 4000-D Technical Information, Alco Chemical™, Technical Bulletin 1601, Nov. 4, 2002, 1 Page.

Alcosperse® 240 Technical Information, Alco Chemical™, Technical Bulletin 3197, May 9, 2000, 1 pp. 1-3.

Belclene® 200 Antiscalant, Houghton Chemical Corporation, © 1993-1994 FMC Corporation, pp. 1-5.

Dequest 2010 Product Information, 1 Page http://www.dequest.com/ProdInfo/D2010.htm (Aug. 15, 2003).

Lamb et al., *Calcium Ion Activities in Supersaturated Solutions Stabilized by Sodium Metaphosphate as Determined by Clay Membrane Electords*, The Journal of the American Chemical Society, vol. LXIX, Aug. to Dec. 1947, pp. 2759-2761.

Shulman, Household Laundry and I&I Markets, Rohm and Haas Company, Powerpoint Presentation Apr. 2003, pp. 1-17.

Van Wazer, *Phosphorous And Its Compounds*, Vol. I, Chemistry, Interscience Publishers, Inc., New York, NY, © 1958, pp. 468-471.

Van Wazer, *Phosphorous And Its Compounds*, Vol. II, Technology, Biological Functions, and Applications, Interscience Publishers, Inc., New York, NY, © 1961, pp. 1809-1822.

METHOD FOR TREATING FEEDWATER

This application is a continuation of U.S. Ser. No. 11/067,301 filed on Feb. 25, 2005, now abandoned.

FIELD OF THE INVENTION

The present invention relates to a method for treating feedwater, a feedwater treatment composition, and an apparatus for treating feedwater.

BACKGROUND OF THE INVENTION

A well-known problem in regions having hard water (i.e., water containing a high level of calcium or magnesium ions) is the formation of scale deposits. Particularly in applications where there are high levels of carbonate and/or phosphate ions, the formation of Ca/Mg scales of these species can lead to buildup that causes an unsightly residue ("film"). The terms "carbonate scale" and "phosphate scale" refer to salts of carbonate and phosphonate with calcium, magnesium, or other metal ions.

Carbonate scale and phosphate scale are particularly troublesome in machine dishwashing applications because they have a tendency to cause unsightly residues or films on dishware, tableware, and especially glassware. This phenomenon is widely known as "hard water film." In general, the presence of phosphates and carbonates are desirable in machine dishwashing compositions because of their cleaning power or building power. As a result, "anti-filming technologies" to reduce the formation of carbonate scale or phosphate scale resulting from automatic dishwashing have been described in the literature.

Exemplary anti-filming technologies have utilized polycarboxylates such as polyacrylates and polymethacrylates. See U.S. Pat. No. 5,591,703. Polycarboxylate technologies assist in the reduction of hard water filming in automatic dishwashing, as well as in more general water treatment applications. Another class of anti-filming materials to reduce phosphate and to some degree carbonate scale is the sulfonate/carboxylate copolymers. See U.S. Pat. No. 5,547,612 and U.S. Pat. No. 6,395,185. Commercially available examples of sulfonate/carboxylate copolymers include Alcosperse 240™ from Alco Chemical and Acusol 586™ from Rohm and Haas Company. The copolymers can be derived from combinations of sulfonate-containing and/or carboxylate-containing ethylenically unsaturated monomers, such as acrylic acid, methylallylsulfonic acid, ethoxylate esters of acrylic acids, and variations thereof.

SUMMARY OF THE INVENTION

A method for treating feedwater is provided according to the present invention. The method includes steps of introducing a feedwater treatment composition into feedwater to provide treated feedwater containing scale inhibitor at a concentration of at least about 0.1 ppm, and combining the treated feedwater stream with a detersive composition to provide a use composition. The use composition can be applied to an article.

The scale inhibitor can include a phosphate scale inhibitor, a carbonate scale inhibitor, or a combination of a phosphate scale inhibitor and a carbonate scale inhibitor. The phosphate scale inhibitor can include a polymer resulting from a reaction of an olefinically unsaturated carboxylic acid monomer and at least one of a copolymerizable sulfonated monomer, a copolymerizable nonionic monomer, or a mixture of a copolymerizable sulfonated monomer and a copolymerizable nonionic monomer. The carbonate scale inhibitor can include phosphonates, polycarboxylates, phosphonocarboxylates, and phosphinocarboxylates.

The detersive composition can include a cleaning composition, a rinse agent composition, or a drying agent composition. The treated feedwater composition can be combined with the detersive composition.

A treatment composition is provided according to the present invention. The treatment composition can include about 5 wt. % to about 95 wt. % of a scale inhibitor and at least about 5 wt. % of a solidifying agent to provide the treatment composition as a solid or at least about 5 wt. % of a diluent to provide the treatment composition as a flowable liquid. The treatment composition can be provided as a solid or as a flowable liquid.

In an alternative embodiment of the present invention, the treatment composition can be provided comprising about 10 wt. % to about 100 wt. % of a scale inhibitor and can be provided in the form of a compressed block having a size of about 1 pound to about 10 pounds.

An apparatus is provided according to the present invention. The apparatus includes a feedwater inlet for providing feedwater, a treated feedwater outlet for providing treated feedwater, a treatment composition reservoir comprising a treatment composition, and a treatment composition delivery line for introducing the treatment composition from the treatment composition reservoir into the feedwater to provide the treated feedwater.

DETAILED DESCRIPTION OF THE INVENTION

A feedwater treatment composition refers to a composition that can be introduced into feedwater to provide treated feedwater. The term "feedwater" refers to the water that is combined with a detersive composition to provide a detersive use composition for application to various articles. Detersive compositions are often available as concentrates and require dilution to achieve a use composition for application to various articles. Water that is added as water of dilution can be referred to as feedwater. In addition, the feedwater can be referred to as a "feedwater stream" to refer to a continuous stream of water. The feedwater treatment composition can be added to feedwater in a batch operation or in a continuous operation. The reference to a "feedwater stream" reflects a continuous operation and the reference to "feedwater" can be batch or continuous.

Treated feedwater can be used the same way that feedwater is used. That is, the treated feedwater can be combined with a detersive composition to provide a detersive use composition, and the detersive use composition can be used to treat articles. Exemplary articles that can be treated with the detersive use composition include motor vehicle exteriors, textiles, food contacting articles, clean-in-place (CIP) equipment, and hard surfaces. Exemplary motor vehicle exteriors include cars, trucks, trailers, etc. that are commonly washed in commercial vehicle washing facilities. Exemplary textiles include those textiles that generally are considered within the term "laundry" and include clothes, towels, sheets, etc. In addition, textiles include curtains. Exemplary food contacting articles include dishes, glasses, eating utensils, bowls, cooking articles, food storage articles, etc. Exemplary CIP equipment include pipes, tanks, heat exchangers, valves, distribution circuits, pumps, etc. Exemplary hard surfaces include floors, counters, glass, walls, etc. In general, hard surfaces can include those surfaces commonly referred to in the cleaning industry as environmental surfaces.

The detersive composition refers to a composition that provides cleaning properties, rinsing properties, or drying properties. Exemplary detersive compositions include detergent compositions, rinse agent compositions, or drying agent compositions. Exemplary detergent compositions include warewashing detergent compositions, laundry detergent compositions, CIP detergent compositions, environmental cleaning compositions, hard surface cleaning compositions (such as those for use on counters or floors), motor vehicle washing compositions, and glass cleaning compositions. Exemplary rinse agent compositions include those compositions used to reduce streaking or filming on a surface such as glass. Exemplary drying agent compositions include dewatering compositions. In the vehicle washing industry, it is often desirable to include a dewatering step where a sheeting or beading agent is applied to the vehicle exterior.

After applying a detersive use composition to an article, the article can be rinsed with a water rinse that is or is not characterized as treated feedwater. For example, a water rinse can be applied that is treated feedwater. Alternatively, a water rinse can be applied that is not treated feedwater. Water that has not been treated with a feedwater treatment composition can be referred to as "non-treated water."

The feedwater treatment composition can be referred to as the "treatment composition." The feedwater treatment composition includes a scale inhibitor to provide the resulting use composition with scale inhibition properties. The scale inhibitor is provided to reduce scaling that would result from components in the water, components in the detersive composition, or components in both the water and the detersive composition. Scaling can sometimes be referred to as filming. Exemplary types of scaling include carbonate scaling and phosphonate scaling. Carbonate scaling can result from calcium bicarbonate in the water and alkalinity in the detersive composition. Phosphate scaling typically results from phosphate in the detersive composition. Phosphate is not a typical species found in most natural water environments. Carbonate is found in many detersive compositions, and is a reactor product of soluble calcium bicarbonate water hardness with heat or alkalinity. Exemplary types of scale inhibitors that can be included in the treatment composition include carbonate scale inhibitors, phosphate scale inhibitors or mixtures of carbonate scale inhibitors and phosphate scale inhibitors. It is expected that other types of scale inhibitors can be included in the treatment composition, if desired, to handle the type of scaling that may be a problem in a given application or environment.

By adding the scale inhibitor to the feedwater before the detersive composition is added or introduced into the feedwater, the scale inhibitor can be more effective in reducing scaling compared to when the scale inhibitor is added as part of a detersive composition. It is believed that certain scale inhibitors can act as a threshold treatment agent to reduce scaling if they are introduced into the water prior to introduction into the water of scaling causing components in the detersive composition. The phrase "threshold treatment agent" is meant to describe an activity that can be characterized as substoichiometric. That is, the scale inhibitor can be effective at concentration levels that are lower than would be expected based on a stoichiometric equivalence of the scale inhibitor and the scale causing component. One theory explaining why the scale inhibitor can work better as a result of being dissolved in the water prior to the introduction of the detersive composition is that the scale inhibitor prevents or reduces macrocrystalline growth. As a result, the scale inhibitor can be used at a lower concentration than would be expected based upon a stoichiometric amount to achieve the desired level of chelation or sequestration.

Detersive compositions can be provided including one or more scale inhibitor to address scaling in a particular application or environment. It is believed that by providing the scale inhibitor along with the detersive composition, the scale inhibitor is less effective because it is generally not available to act substoichiometrically. By introducing the scale inhibitor into the feedwater before introduction of the detersive composition into the feedwater, it is believed that the scale inhibitor can be more effective or successful in deterring scale formation because of its ability to act substoichiometrically. In addition, because the scale inhibitor can be effective at substoichiometric levels, it is believed that significantly less scale inhibitor can be used to achieve desired results when applied to feedwater prior to the introduction of the detersive composition compared with the introduction of the scale inhibitor along with the detersive composition. It should be appreciated that these theories are just that. They are theories proposed to explain the observation of enhanced anti-scaling properties when the scale inhibitor are introduced into the feedwater prior to introduction of the detersive composition.

Because of the introduction of the scale inhibitor to the feedwater prior to introduction into the feedwater of the detersive composition, the detersive composition can be adjusted to remove or reduce the scale inhibitor that may be present in the detersive composition. By introducing the scale inhibitor into the feedwater prior to introduction into the feedwater of the detersive composition, less scale inhibitor can be used to achieve better results and the scale inhibitor component of the detersive composition can be removed.

The scale inhibitor can be provided as a carbonate scale inhibitor, a phosphate scale inhibitor, or a combination of a carbonate scale inhibitor and a phosphate scale inhibitor. In addition, the scale inhibitor can include inhibitors directed at scaling other than carbonate scale and phosphate scale.

Figure 1:
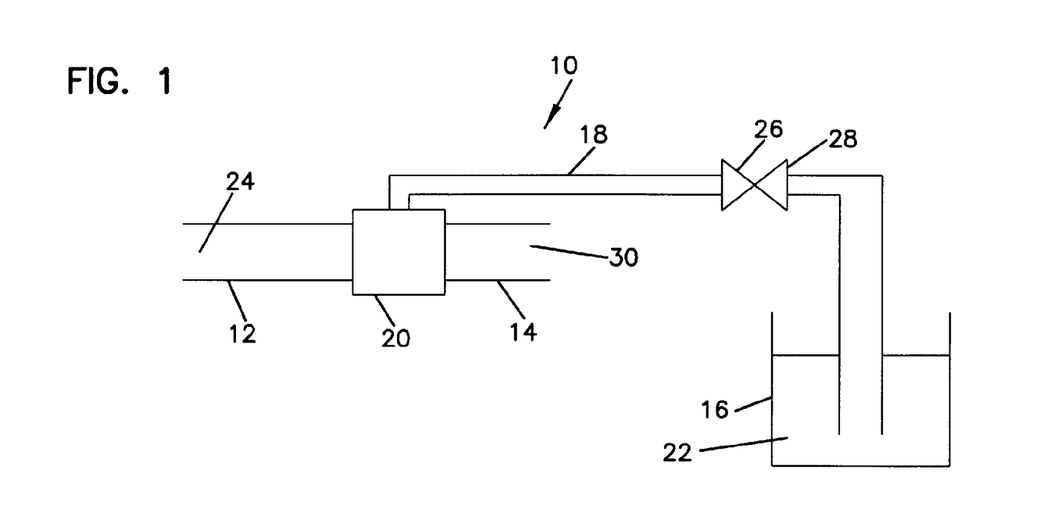
FIG. 1 is a schematic view of an apparatus for treating feedwater according to the present invention.
Figure 2:
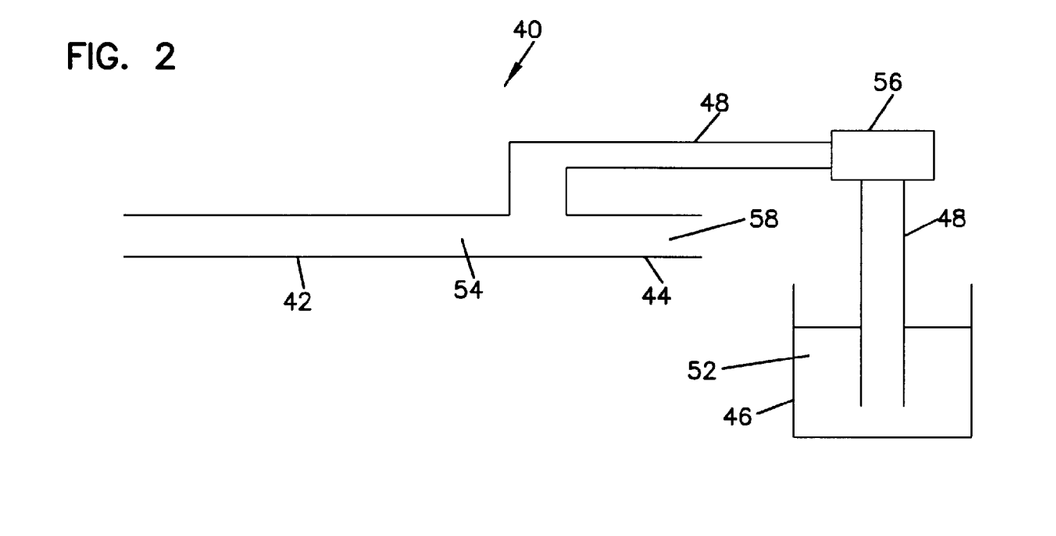
FIG. 2 is a schematic view of an alternative embodiment of an apparatus for treating feedwater according to the present invention.

In order to introduce the scale inhibitor into the feedwater, numerous apparatus designs can be configured including batch designs, continuous designs, and combination batch and continuous designs. In the case of a batch design, the treatment composition can be added to a body of water to provide treated feedwater that can be used as desired. It is expected that a continuous operation may be advantageous by allowing the treated feedwater to be prepared as it is needed and without having to create a storage tank for holding the treated feedwater. In a continuous design, the scale inhibitor can be introduced into a feedwater stream as the feedwater stream is being directed for subsequent use. In addition, facilities can be retrofit to include a feedwater treatment apparatus for continuous designs relatively conveniently. FIGS. 1 and 2 provide alternative designs of continuous feedwater treatment techniques.

Referring to FIG. 1, a schematic of an apparatus for treating feedwater according to the present invention is shown at reference number 10. The apparatus 10 includes a feedwater inlet 12, a treated feedwater outlet 14, a treatment composition reservoir 16, and a treatment composition delivery line 18. In one embodiment, an aspirator 20 can be used to draw the treatment composition 22 from the treatment composition reservoir 16, through the treatment composition delivery line 18, and into the feedwater 24. A flow control device 26 such as a valve 28 can be provided in the treatment composition delivery line 18 to control the flow of the treatment composition 22 into the feedwater 24. The aspirator 20 can be any type of aspirating device that draws another fluid into a flowing liquid stream. The resulting treated feedwater 30 can be provided having a desired concentration of the treatment composition therein.

Referring to FIG. 2, an alternative embodiment of an apparatus for treating feedwater is shown at reference number 40. The apparatus 40 includes a feedwater inlet 42, a treated feedwater outlet 44, a treatment composition reservoir 46, and a treatment composition delivery line 48. According to the apparatus 40, the treatment composition 52 can be pumped into the feedwater 54 via the treatment composition pump 56 to provide the treated feedwater 58. The treatment composition pump 56 can be any type of pump that causes the treatment composition 52 to flow into the feedwater 54 so that the resulting treated feedwater 58 has the desired concentration of the treatment composition 52 therein. Exemplary pumps that can be used include proportioning pumps, peristaltic pumps, piston pumps, bellows pumps, squeeze tube pumps, gear pumps, etc.

An exemplary apparatus that can be used for treating feedwater and that utilizes a venturi is described in U.S. Pat. No. 6,656,353 B2 to Kilawee et al. and assigned to Ecolab Inc., the assignee of the above-identified patent application. The entire disclosure of U.S. Pat. No. 6,656,353 B2 is incorporated herein by reference. The dispensing device disclosed in U.S. Pat. No. 6,656,353 B2 provides for dispensing of a chemical composition into water flowing through a flow line. A portion of the water from the flow line is diverted to contact a solid chemical composition and form a liquid concentrate, and the liquid concentrate is drawn into the water flow line as a result of a venturi action. Metering of the liquid concentrate allows one to achieve the desired concentration in the water.

Treatment Composition

The treatment composition can be available in various forms including as a solid, a liquid, a gel, or paste. When provided as a solid, the treatment composition can be provided in the form of a block, pellets, aggregate, powder, capsules, tablets, etc. When provided as a block, the treatment composition can have a size of greater than about 1 pound. Providing the treatment composition as a block can be advantageous when it is desired to periodically add blocks to a hopper or other container where a liquid concentrate is generated as a result of liquid flowing against a surface of the block. When the treatment composition is provided as a block, the block can have a size of at least about 1 pound. The block can be provided having a size as large as desired for a particular application. In many applications, it is expected that a block will have a size of less than about 10 pounds although it should be understood that the block can have a size that is much larger than 10 pounds. The block can have a size of between about 2 pounds and about 6 pounds. Providing the treatment composition in various other solid forms can be advantageous when it is desired to generate a liquid concentrate that is then added to the feedwater to provide treated feedwater.

The treatment composition includes a scale inhibitor. Other components that can be included in the treatment composition including hardening agents and diluents. Hardening agents can be included to provide the treatment composition as a solid in the form of a block, pellets, aggregate, capsule, tablet, etc. Diluents can be included in the treatment composition to help maintain the flowability of the treatment composition when it is provided in the form of a liquid. In addition, diluent can be included when it is desired to dilute the treatment composition when the treatment composition is provided as a solid, liquid, gel, or paste. The diluent can, if desired, be characterized as a filler.

The treatment composition can include the scale inhibitor in an amount that provides a treatment composition having the desired amount of scale inhibitor therein. For example, the treatment composition can include about 0.1 wt. % to about 100 wt. % of the scale inhibitor, and can include about 10 wt. % to about 100 wt. % of the scale inhibitor. The scale inhibitor can include carbonate scale inhibitor, phosphate scale inhibitor, or a mixture of a carbonate scale inhibitor and a phosphate scale inhibitor. An additional component of the treatment composition can be a solidifying agent and/or a diluent. The solidifying agent can be used to provide the treatment composition as a solid. It should be understood that a treatment composition can be provided as a solid without the use of a solidifying agent. For example, a treatment composition containing 100 wt. % scale inhibitor can be compressed into a tablet, a pellet, or a block. When compressed into a block, it is expected that the block can have a size of about 1 pound to about 10 pounds. The treatment composition can include a diluent to provide the treatment composition in the form of a liquid. By way of example, the treatment composition can include at least about 5 wt. % of the scale inhibitor and at least 5 wt. % of the solidifying agent or the diluent. In addition, the treatment composition can include about 5 wt. % to about 95 wt. % of the scale inhibitor and about 5 wt. % to about 95 wt. % of the solidifying agent or the diluent. In the case of a solid, the treatment composition can include about 10 wt. % to about 90 wt. % of the scale inhibitor and about 10 wt. % to about 90 wt. % of the solidifying agent, and the treatment composition can include about 15 wt. % to about 85 wt. % of the scale inhibitor and about 15 wt. % to about 85 wt. % of the solidifying agent. In the case of a liquid treatment composition, the treatment composition can include about 5 wt. % to about 75 wt. % of the scale inhibitor and about 25 wt. % to about 95 wt. % of the diluent, and the treatment composition can include about 10 wt. % to about 60 wt. % of the scale inhibitor and about 40 wt. % to about 90 wt. % of the diluent.

It is desirable to provide the treated feedwater with a concentration of scale inhibitor that is sufficient to provide a desired level of scale inhibition. For example, the scale inhibitor can be provided in the treated feedwater at a concentration of at least about 0.1 ppm to achieve a desired level of scale inhibition. The upper limit on the amount of scale inhibitor in the feedwater composition can be provided based upon a decrease of scale inhibition properties as the concentration of scale inhibitor increases. In general, it may be desirable to avoid the cost associated with adding additional scale inhibitor when the increased amount of scale inhibitor fails to provide additional scale inhibition properties. In general, it is expected that an upper limit on the concentration of scale inhibitor in the treated feedwater can be provided at about 200 ppm. The concentration of scale inhibitor in the treated feedwater can be about 0.5 ppm to about 150 ppm, about 1 ppm to about 100 ppm, and about 2 ppm to about 50 ppm.

The scale inhibitor can include a carbonate scale inhibitor, a phosphate scale inhibitor, or a combination of a carbonate scale inhibitor and a phosphate scale inhibitor. In general, it is believed that the presence of the carbonate scale inhibitor helps reduce the occurrence of carbonate scaling as a result of the presence of carbonate, and the presence of a phosphate scale inhibitor helps reduce the occurrence of phosphate scaling as a result of the presence of phosphate. The treatment composition can include both a carbonate scale inhibitor and a phosphate scale inhibitor, and can include one or more type of either or both of the carbonate scale inhibitor and the phosphate scale inhibitor.

Carbonate Scale Inhibitor

The carbonate scale inhibitor can be characterized as a component that when introduced into feedwater, has an effective of reducing carbonate scaling as a result of calcium bicarbonate that may be present in the feedwater or alkalinity in the detersive composition. Exemplary carbonate scale inhibitors include phosphonates, polycarboxylates, or mixtures of phosphonates and polycarboxylates. Exemplary phosphonates include 1-hydroxyethane-1,1-diphosphonic acid $CH_3C(OH)[PO(OH)_2]$; aminotri(methylenephosphonic acid) $N[CH_2PO(OH)_2]_3$; aminotri(methylenephosphonate), sodium salt 2-hydroxyethliminobis(methylenephosphonic acid) $HOCH_2CH_2N[CH_2PO(OH)_2]_2$; diethylenetriaminepenta (methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bix(hexamethylene)triamine(pentamethylenephosphonic acid) $(HO_2)POCH_2N[(CH_2)_6N[CH_2PO(OH)_2]_2]_2$; and phosphorus acid $H_3PO_3$. Exemplary polycarboxylates include polyacrylic acid, polymaleic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers.

Phosphate Scale Inhibitor

Phosphate scale inhibitors that can be used include those components that reduce phosphate scaling when introduced into a feedwater prior to the introduction of a detersive composition containing phosphate. It should be understood that many components that provide phosphate scale inhibition may also provide some carbonate scale inhibition. In addition, many of the components identified as phosphate scale inhibitors can also be characterized as carbonate scale inhibitors. Exemplary phosphate scale inhibitors include polymers resulting from a reaction of an olefinically unsaturated carboxylic acid monomer and a copolymerizable sulfonated monomer, a copolymerizable nonionic monomer, or a mixture of a copolymerizable sulfonated monomer and a copolymerizable nonionic monomer.

The olefinically unsaturated carboxylic acid monomer can include $C_3-C_{40}$, monocarboxylic acids, $C_3-C_{40}$ dicarboxylic acids, or $C_3-C_{40}$ polycarboxylic acids. The olefinically unsaturated carboxylic acid monomer can be linear, branched, or cyclic. The olefinically unsaturated carboxylic acid monomer can be provided as a salt or an anhydride. Exemplary salts include alkali metal salts, alkaline earth metal salts, and ammonium salts. Exemplary olefinically unsaturated carboxylic acid monomers include acrylic acid co-monomers such as acrylic acid, methacrylic acid, ethacrylic acid, alpha-chloro-acrylic acid, alpha-cyano acrylic acid, beta methyl-acrylic acid (crotonic acid), alpha-phenylacrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, and tricarboxyethylene. For the polycarboxylic acid monomers, an anhydride group can be formed by the elimination of one molecule of water from two carboxyl groups located on the same polycarboxylic acid molecule. Exemplary carboxylic monomers include monoolefinic acrylic acids having a substituent selected from the class consisting of hydrogen, halogen, hydroxyl, $C_1-C_{20}$ alkyl, $C_6-C_{12}$ aryl, $C_6-C_{16}$ aralkyl, $C_7-C_{16}$ alkaryl radicals and $C_5-C_{16}$ cycloaliphatic radicals. As used herein, (meth) acrylic acid is intended to include acrylic acid and methacrylic acid. Preferred unsaturated carboxylic acid monomers include acrylic and methacrylic acid.

Exemplary copolymerizable sulfonated monomers include allyl hydroxypropanyl sulfonate ether, allylsulfonic acid, methallylsulfonic acid, styrene sulfonic acid, vinyl toluene sulfonic acid, acrylamido alkane sulfonic acid, alkyloxybenzene sulfonic acid, 2-alkylallyloxybenzene sulfonic acid(s) such as 4-sulfophenol methallyl ether, and the alkali or alkaline earth metal or ammonium salts thereof.

Exemplary copolymerizable nonionic monomers include vinyl or allyl compounds selected from the group consisting of $C_1-C_6$ alkyl esters of (meth)acrylic acid, acrylamide and the $C_1-C_6$ alkyl-substituted acrylamides, the N-alkyl-substituted acrylamides and the N-alkanol-substituted acrylamides, N-vinyl pyrrolidone or any other vinyl amide. Also useful are the $C_1-C_6$ alkyl esters and the $C_1-C_6$ alkyl half-esters of unsaturated vinylic acids, such as maleic acid and itaconic acid. Exemplary copolymerizable nonionic monomers are selected from the group consisting of methyl (meth)acrylate, mono- and dimethyl maleate, mono- and di-ethyl itaconate, and (meth)allyl acetates, propionates and valerates. Crosslinking monomers such as diallyl maleate, alkylene bisacrylamide and triallyl cyanurate may also be employed herein to provide crosslinking. It should be understood that the term "acid" includes not only the acid function but also corresponding anhydride and salt forms. The salts may be alkali metals, alkaline earth metal, ammonium, and $C_2-C_{10}$ alkanolammonium types.

The polymer can be prepared based upon a ratio of the olefinically unsaturated carboxylic acid monomer and the other component including a copolymerizable sulfonated monomer, a copolymerizable nonionic monomer, or a combination of a copolymerizable sulfonated monomer and a copolymerizable nonionic monomer in amounts sufficient to provide desired phosphate scale inhibition. In general, the polymer can be prepared based upon about 50 wt. % to about 99 wt. % of the olefinically unsaturated carboxylic acid monomer. In addition, the polymer can be prepared based upon about 70 wt. % to about 98 wt. % of the olefinically unsaturated carboxylic acid monomer, and can be prepared based upon about 75 wt. % to about 95 wt. % of the olefinically unsaturated carboxylic acid monomer. In addition, the amount of the copolymerizable sulfonated monomer, the copolymerizable nonionic monomer, or the combination of copolymerizable sulfonated monomer and copolymerizable nonionic monomer can be provided at about 1 wt. % to about 50 wt. %, about 2 wt. % to about 30 wt. %, and about 5 wt. % to about 25 wt. %. The weight average molecular weight of the polymers can be about 1500 to about 250,000, and can be from about 5,000 to about 100,000.

An exemplary phosphate scale-inhibiting copolymer includes a tetrapolymer of 4-sulfophenol methallyl ether, sodium methallyl sulfonate, acrylic acid, and methyl methacrylate. The monomer, 4-sulfophenol methallyl ether, has the formula (I):

$$CH_2=C(CH_3)CH_2OC_6H_4SO_3M \qquad (I)$$

where M represents hydrogen, alkali metal, alkaline earth metal or ammonium ions. Other exemplary phosphate scale-inhibiting copolymers include: copolymer of acrylic acid and 4-sulfophenol methallyl ether; copolymer of acrylic acid and 2-acrylamido-2-methylpropane sulfonate; terpolymer of acrylic acid, 2-acrylamido-2-methylpropane sulfonate and sodium styrene sulfonate; copolymer of acrylic acid and vinyl pyrrolicone; and a copolymer of acrylic acid and acrylamide. Exemplary commercially available copolymers that can be used as phosphate scale inhibitors include: Alcosperse® 240, Aquatreat® AR 540 and Aquatreat® MPS available from Alco Chemical; Acumer® 3100, Acumer® 2100 and Acumer® 2000 available from Rohm and Haas Company; Goodrich K-798, K-775 and K-797 available from BF Goodrich; ACP 1042 available from ISP technologies, Inc.; and polyacrylic acid/acrylamide available from Aldrich.

Phosphate and carbonate scale inhibitors can include "phosphinoacrylic polymers" that result from the condensation of low molecular weight, unsaturated monomers, such as those used to form the acrylic polymers described above, with sodium hypophosphite. For example, phosphinoacrylic polymers can have the general formula: $H—[CH(CO_2H)CH_2]_n P—(=O)OH[CH_2CH(CO_2H)]_m^-H$ wherein the molecular weight and ratio of propionic acid units to the $^-P(=O)(OH)$—unit may be varied over a wide range. For example, n+m may vary from about 3 to about 75 and from about 4 to about 70. Commercially available phosphinopolycarboxylic acids having weight ratios of total polyacrylic acid to phosphinoxy of from about 3:1 to 35:1 and molecular weights of about 200-5000, preferably about 250-3000, are useful in the present invention. An exemplary phosphinopolycarboxylic acid is available as Belsperse® 161 from BioLabs as a 46-52% aqueous solution (molecular weight of about 1200). Phosphinoacrylic polymers or phosphinoacrylate polymers were developed by a division of Ciba-Geigy and is now part of BioLabs. A Belsperse® 161 type product is available from Buckman as BSI® 361, from Vulcan as Mayosperse® 500 and from Rohm and Haas as Acumer® 4161.

When the treatment composition includes a mixture of a carbonate scale inhibitor and a phosphate scale inhibitor, the weight ratio of the carbonate scale inhibitor to the phosphate scale inhibitor can be selected to provide the desired levels of carbonate scale inhibition and phosphate scale inhibition. By way of example, the weight ratio of the carbonate scale inhibitor to the phosphate scale inhibitor can be about 1:1 to about 1:10.

Hardening Agent

The feedwater treatment composition can include a hardening agent in an amount sufficient to provide the composition as a solid. The hardening agent can be referred to as the solidifying agent.

The feedwater treatment composition, when provided as a solid, includes a sufficient amount of the hardening agent so that the composition remains as a solid under conditions normally encountered when storing the composition. In general, this means that the solid should remain as a solid and resist melting during transportation and storage. For example, the composition should be capable of resisting melting at 120° F. and atmospheric pressure. The amount of the hardening agent will be sufficient so that the feedwater treatment composition remains as a solid until it is contacted with water. In the feedwater treatment composition, the scale inhibitor is considered the active component of the composition and it is generally desirable to provide as much of the active component in the feedwater treatment composition as possible.

An exemplary hardening agent includes polyethylene glycol. Polyethylene glycol can be provided as a mixture of different molecular weight polyethylene glycols. In general, when polyethylene glycol is used as a hardening agent, it can be used in an amount sufficient to provide hardening of the feedwater treatment composition. For example, the amount of polyethylene glycol in a hardened feedwater treatment composition can be provided at least about 5 wt. %. In general, it is expected that sufficient hardening can be provided at an amount of polyethylene glycol that is less than about 55 wt. %. The solid detergent composition can include about 8 wt. % to about 30 wt. % polyethylene glycol. In addition, it should be understood that the feedwater treatment composition can include mixtures of various hardening agents and that the amount of polyethylene glycol, when used with other hardening agents, may be relatively small as a result of at least part of the hardening effect being contributed by other agents.

An exemplary hardening agent includes urea. The feedwater treatment composition can include a sufficient amount of urea to provide the composition as a solid. In general, the amount of urea in the composition can be at least about 5 wt. %. In addition, it is generally expected that the hardening effect can be provided by including an amount of urea at less than about 32 wt. %. The solid composition can include urea at a composition of about 8 wt. % to about 26 wt. %.

When the scale inhibitor is provided as an acid, a solid can be formed by combining the acid with an alkaline metal hydroxide to form an alkaline sale of the scale inhibitor. By way of example, the scale inhibitor can be combined with the alkaline metal hydroxide in amounts of about 10 wt. % to about 90 wt. % of the scale inhibitor and about 10 wt. % to about 90 wt. % of the alkaline metal hydroxide. In addition, the scale inhibitor can be provided in an amount of about 15 wt. % to about 75 wt. % and the alkaline metal hydroxide can be provided in an amount of about 15 wt. % to about 75 wt. %.

It should be understood that combinations of various hardening agents can be used to provide a hardening effect. In the case where combinations of different hardening agents are used, it is expected that the amount of each of the types of hardening agent may be less than would be necessary if that were the only hardening agent used to provide the feedwater treatment composition as a solid. In general, it is expected that the feedwater treatment composition can include a hardening agent in an amount of about 10 wt. % to about 90 wt. % to provide solid properties. In addition, the amount of hardening agent can be provided in the feedwater treatment composition in an amount of about 15 wt. % to about 90 wt. %.

Diluent

A diluent can be included in the feedwater treatment composition to help maintain stability or solubility of the treatment composition. An exemplary diluent that can be provided in the treatment composition includes water. In the case of a liquid treatment composition, the amount of diluent can be provided up to about 95 wt. %. In general, it is expected that if a diluent is going to be used in the treatment composition, it can be included in an amount of at least about 0.1 wt. %. In addition, fillers can be included in the treatment composition and the fillers can be characterized as a form of diluent. In the case of a solid treatment composition, exemplary fillers that can be used include potassium chloride, sodium chloride, and sodium sulfate. It is expected that when the solid treatment composition includes a filler, it will be included in the composition in an amount of at least about 0.01 wt. % and can be provided in any amount to provide the desired level of "fill." Exemplary upper amounts of filler in the solid detergent composition can be, for example, 10 wt. %, 8 wt. %, or 5 wt. %.

In the case of a liquid treatment composition, a filler that can be used includes water. When water is included in the liquid treatment composition, it can be included in amounts up to about 95 wt. % and can be included in amounts of about 10 wt. % to about 80 wt. %, and about 25 wt. % to about 75 wt. %.

Other Components

The feedwater treatment composition can be used to provide a treated feedwater stream for a detersive composition. The Applicants have found that by introducing a scale inhibitor into the feedwater prior to introduction of the chemicals normally associated with a detersive composition, enhanced scale inhibition can be achieved. The feedwater treatment composition can be formulated so that the composition includes little or none of the other components often encountered in a detersive composition. The Applicants have found that getting the scale inhibitor into the feedwater prior to introduction of a detersive composition into the feedwater provides enhanced scale inhibition compared with introducing the scale inhibitor as part of the detersive composition. Accordingly, the feedwater treatment composition can be provided so that components other than the scale inhibitor, the solidifying agent, or the diluent can be limited. Exemplary components that can be excluded from the treatment composition include anti-redeposition agents, surface active agents or surfactants, bleaching agents, brighteners, corrosion inhibitors, and enzymes. If any of these components are present in the treatment composition, they can be present at sufficiently low levels. For example, the anti-redeposition agent can be excluded at levels greater than 1 wt. %. The surface active agent or surfactants can be excluded at levels greater than about 0.1 wt. %. The bleaching agents can be excluded at levels greater than about 0.1 wt. %. The brightener can be excluded at levels greater than about 0.1 wt. %. The corrosion inhibitor can be excluded at levels greater than about 1 wt. %. The enzyme can be excluded at levels greater than about 0.01 wt. %.

It is expected that by introducing the scale inhibitor into the feedwater prior to introduction of the detersive composition into the feedwater, the detersive composition can be adjusted to remove certain component that might have been provided in the detersive composition for providing anti-filming properties. Although the detersive composition can be adjusted in view of the treatment to the feedwater, it is believed that the detersive composition can be used as is if desired.

Detersive Composition

The treated feedwater stream can be combined with a detersive composition to provide a detersive use composition. The detersive composition refers to compositions that provide a cleaning effect, a rinsing effect, or a drying effect. Compositions that provide cleaning effect are often referred to as detergent compositions. Compositions that provide rinsing effect are often referred to as rinse agent or sheeting agent compositions. Compositions that provide drying effect are often referred to as drying agent compositions.

Detersive compositions often include various components such as alkaline sources, surfactants, chelating/sequestering agents, solvents, oxidizing agents, reducing agents, bleaching agents, bleach activators, and enzymes. Examples of these components are described. It should be understood that additional components can be used in the detersive composition, when desired.

The detersive composition can include a source of alkalinity to provide a detersive use composition having a desired pH. Exemplary sources of alkalinity include the alkali metal hydroxides, alkaline earth metal hydroxides, amine including the alkylamines and ethanolamines, alkali metal carbonates or bicarbonates, silicates, and so forth, and mixtures thereof.

A variety of surfactants can be used in the detersive composition, including anionic, nonionic, cationic, and zwitterionic surfactants, which are commercially available from a number of sources. Anionic and nonionic agents are preferred. For a discussion of surfactants, see Kirk-Othmer, *Encyclopedia of Chemical Technology*, Third Edition, volume 8, pages 900-912. Preferably, the detersive composition comprises a cleaning agent in an amount effective to provide a desired level of cleaning. The detersive composition can include about 0 to about 20 wt. % cleaning agent, or about 1.5 wt. % to about 15 wt. % cleaning agent.

Anionic surfactants useful in the present cleaning compositions, include, for example, carboxylates such as alkylcarboxylates (carboxylic acid salts) and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, alkylether sulfates; and phosphate esters such as alkylphosphate esters. Exemplary anionics are sodium alkylarylsulfonate, alpha-olefinsulfonate, and fatty alcohol sulfates.

Nonionic surfactants useful in the detersive composition, include those having a polyalkylene oxide polymer as a portion of the surfactant molecule. Such nonionic surfactants include, for example, chlorine-, benzyl-, methyl-, ethyl-, propyl-, butyl-, and other alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ethers; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers including an ethylene oxide/propylene oxide block copolymer such as those commercially available under the trademark PLURONIC (BASF-Wyandotte). Silicone surfactants such as the ABIL B8852 can also be used.

Cationic surfactants useful for inclusion in a detersive composition for sanitizing or fabric softening, include amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl0-2-imidazoline, a 2-alkyl-1-(2-hydroxyethyl)-2-imidazoline; and quaternary ammonium salts, as for example, alkylquaternary ammonium chloride surfactants such as n-alkyl ($C_{12}$-$C_{18}$)dimethylbenzyl ammonium chloride, n-tetradecyldimethylbenzylammonium chloride monohydrate, and a naphthalene-substituted quaternary ammonium chloride such as dimethyl-1-naphthylmethylammonium chloride.

Chelating/sequestering agents can provide water hardness control in the alkaline wash solution, and more importantly, can provide assistance in the soil removal process by interacting with various calcium and magnesium complexes of both organic and inorganic soil components. Water hardness ions can negatively interfere with the cleaning process by forming less soluble complexes with fatty acids or other surfactants. Chelating/sequestering agents provide water hardness control by interacting with water hardness ions such as calcium and magnesium hydroxides, carbonates, sulfates, chlorides, and other ions which are less soluble in alkaline solutions and which, upon exposure to heat as during the dehydrating step, may precipitate from solution. The chelating/sequestering agents thus help to keep the water hardness ions in solution.

Any chelating/sequestering agents known to those in the art may find utility herein. Examples of suitable chelating/sequestering agents include, but are not limited to, aminocarboxylic acids, condensed phosphates, phosphonates, polyacrylates, alkali metal gluconates, citrates, etc.

In general, any chelating molecule which is capable of coordinating (i.e., binding) the metal ions commonly found in natural water to prevent the metal ions from interfering with the action of the other detersive ingredients of a cleaning composition may find utility herein. The chelating/sequestering agent may also function as a threshold agent when included in an effective amount. Preferably, a cleaning composition includes about 0.1-1 wt %, preferably from about 0.05-5 wt %, of a chelating/sequestering agent.

More particularly, suitable aminocarboxylic acids include, for example, n-hydroxyethyliminodiacetic acid, nitrilotriacetic acid (NTA), ethylenediaminetetraacetic acid (EDTA), N-hydroxyethyl-ethylenediaminetri-acetic acid (HEDTA), diethylenetriaminepentaacetic acid (DTPA), and the like.

Suitable examples of condensed phosphates useful in the present composition include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Solvents that may be used in detersive compositions include glycol ethers, alcohols, esters such as soy methyl ester, acetates, cyclic acids, and mixtures thereof.

Oxidizing agents that may be used in detersive compositions include the alkali metal hypochlorites such as sodium and potassium hypochlorite, chlorine dioxide solutions, various peracids, and mixtures thereof.

Reducing agents that may be used in detersive compositions include the alkali metal thiosulfates such as sodium thiosulfate, the alkali metal sulfites such as sodium sulfite, the alkali metal metabisulfites such as sodium metabisulfite, and mixtures thereof.

Bleaching agents that may be used in detersive compositions include compounds which release halogens (e.g. Cl, Br, OCl and/or OBr) under the conditions encountered during the cleansing process such as a chlorine, hypochlorite, chloramine, alkali metal dichloroisocyanurates, chlorinated trisodium phosphate, the alkali metal hypochlorides, monochloramine and dichloramine, and the like and the bromine releasing compounds as well.

Oxygen bleaching agents may also be employed including the peroxygen type or active oxygen source such as hydrogen peroxide, organic and inorganic peroxohydrates, organic peroxyacids including peroxycarboxylic, peroxyimidic and amidoperoxycarboxylic acids, or their salts including alkali metal or mixed-cation salts, perborates, sodium carbonate peroxyhydrate, phosphate peroxyhydrates, potassium permonosulfate, and sodium perborate mono and tetrahydrate, with and without activators such as tetraacetylethylene diamine, peracids which can be employed both as free standing and as bleach activators, inorganic peroxides, inorganic peroxoacids and their salts, certain organic peroxides, and the like, and mixtures thereof.

Bleach activators known in the art may be used in detersive compositions to activate bleaches. Exemplary bleach activators include, for example, tetraacetyl ethylene diamine (TAED), sodium nonanoyloxybenzene sulphonate (SNOBS), glucose pentaacetate (GPA), tetra acetylmethylene diamine (TAMD), triacetyl cyanurate, sodium sulphonyl ethyl carbonic acid ester, sodium acetyloxybenzene and the mono long-chain acyl tetraacetyl glucoses as disclosed in WO 91/10719 incorporated by reference herein in its entirety, choline sulphophenyl carbonate (CSPC) can also be employed, as disclosed in U.S. Pat. Nos. 4,751,015 and 4,818, 426 both of which are incorporated by reference herein in their entirety.

EXAMPLE 1

A product was manually added to the rinse water or the initial water charge (feedwater) of a dishwashing machine. The dishwashing machine used was an AM-14 high temperature dishwashing machine from Hobart. The product was added to the dishwashing machine to treat any additional water that was added during a cycle. Exemplary products include:
Dequest 2000 (ATMP—aminotrimethylene phosphonic acid (50% active))
Dequest 2010 (HEDP—1-hydroxyethylene-1,1-diphosphinic acid-hydroxyethylidene diphosphonic acid (60% active))
Optidose 4210 (polymaleic acid, molecular weight 500-1, 000, 50% solids)
Alcoguard 4000 (sulfonated polymer)
Alcosperse 240 (copolymer of acrylic acid and sulfonated monomers)
Alcosperse 747 (modified polycarboxylate)
Accusol 587 (weak acid/strong acid (sulfonic) copolymer)
Accusol 586 (weak acid/strong acid (sulfonic) copolymer)

The detergent composition used in the dishwashing machine was a high alkaline solid containing sodium tripolyphosphate and sodium carbonate. The tests were run for 100 cycles on six glasses. The grading system for the glasses is based on a scale of 1-5 where 1 means no film, 2 means trace film, 3 means light film, 4 means medium film, and 5 means heavy film. The results of the experiment are reported in Table 1.

TABLE 1

| | Glass | | | | | | |
| --- | --- | --- | --- | --- | --- | --- | --- |
| Component | 1 | 2 | 3 | 4 | 5 | 6 | Total |
| None (Control) | 5 | 3.5 | 3 | 3 | 3 | 5 | 22.5 |
| Optidose 4210 product | 3.5 | 2.5 | 1.5 | 1.5 | 2 | 3.5 | 14.5 |
| Alcoguard 4000 product | 3.75 | 1.5 | 1.5 | 1.5 | 1.5 | 4 | 13.75 |

The Optidose 4210 product and the Alcoguard 4000 product were used at levels of 5 ppm and 10 ppm, respectively. When the Optidose 4210 product and the Alcoguard 4000 product were used to treat all of the water entering the dishwashing machine, there was significant improvement in filming of the glasses as compared to the control.

EXAMPLE 2

An exemplary liquid feedwater treatment composition was prepared having the following components:
31.2 wt. % Dequest 2010 product
31.2 wt. % Alcosperse 240 product
37.6 wt. % water.

A solid feedwater treatment composition was prepared having the following components:
41.5 wt. % Alcoguard 4000
41.5 wt. % Dequest 2010
17 wt. % sodium hydroxide.

A solid feedwater treatment composition was prepared including a carbonate scale inhibitor and having the following components:
68.5 wt. % Dequest 2010
31.5 wt. % sodium hydroxide.

The invention claimed is:

1. A method for treating feedwater comprising:
   (a) introducing a treatment composition into feedwater to provide treated feedwater containing a carbonate scale inhibitor at a concentration of at least about 0.1 ppm before a detersive composition is added or introduced into the feedwater;
   (b) combining the treated feedwater stream with the detersive composition to provide an use composition;
   (c) delivering the use composition to a point of use; and
   (d) contacting the use composition with an article, to inhibit carbonate scale including film on said article.

2. A method according to claim 1, wherein the treated feedwater comprises the scale inhibitor at a concentration of about 0.1 ppm to about 200 ppm.

3. A method according to claim 1, wherein the scale inhibitor comprises a mixture of at least one carbonate scale inhibitor and at least one phosphate scale inhibitor.

4. A method according to claim 3, wherein the treated feedwater comprises about 1 ppm to about 100 ppm of a mixture of at least one carbonate scale inhibitor and at least one phosphate scale inhibitor.

5. A method according to claim 3, wherein the at least one phosphate scale inhibitor comprises a polymer resulting from a reaction of an olefinically unsaturated carboxylic acid monomer and at least one of a copolymerizable sulfonated monomer, a copolymerizable nonionic monomer, or a mixture of at least one copolymerizable sulfonated monomer and at least one copolymerizable nonionic monomer.

6. A method according to claim 5, wherein the olefinically unsaturated carboxylic acid monomer comprises a $C_3$-$C_{40}$ monocarboxylic acid, a $C_3$-$C_{40}$ dicarboxylic acid, or a $C_3$-$C_{40}$ polycarboxylic acid.

7. A method according to claim 6, wherein the olefinically unsaturated carboxylic acid monomer comprises an acid, a salt, or an anhydride.

8. A method according to claim 6 wherein the olefinically unsaturated carboxylic acid comprises acrylic acid, methacrylic acid, ethacrylic acid, alpha-chloro-acrylic acid, alpha-cyano acrylic acid, beta methyl-acrylic acid, alpha phenylacrylic acid, beta-acryloxy propionic acid, sorbic acid, alpha-chloro sorbic acid, angelic acid, cinnamic acid, p-chloro cinnamic acid, beta styryl acrylic acid, itaconic acid, maleic acid, citraconic acid, mesaconic acid, glutaconic acid, aconitic acid, fumaric acid or tricarboxyethylene, or mixtures thereof.

9. A method according to claim 6, wherein the carboxylic monomer comprises monoolefinic acrylic acid having a substituent selected from hydrogen, halogen, hydroxyl, $C_1$-$C_{20}$ alkyl, $C_6$-$C_{12}$ aryl, $C_6$-$C_{16}$ aralkyl, $C_7$-$C_{16}$ alkaryl, $C_5$-$C_{16}$ cycloaliphatic, or mixtures thereof.

10. A method according to claim 1, wherein the scale inhibitor comprises at least one carbonate scale inhibitor further comprising at least one phosphonate, at least one polycarboxylate, or mixtures thereof.

11. A method according to claim 1 wherein the article comprises motor vehicle exterior, textile, food contacting article, clean-in-place (CIP) equipment, hard surface or mixture thereof.

12. A method according to claim 1, wherein the scale inhibitor comprises a mixture of carbonate scale inhibitor and phosphate scale inhibitor at a weight ratio of the carbonate scale inhibitor to the phosphate scale inhibitor of about 1:1 to about 1:10.

13. A method according to claim 11, further comprising:
   (e) rinsing the use composition from the article.

14. A method according to claim 1, wherein the detersive composition comprises a cleaning composition, a rinse agent composition, or a drying agent composition.

* * * * *